(12) United States Patent
Schuler et al.

(10) Patent No.: US 11,411,457 B2
(45) Date of Patent: Aug. 9, 2022

(54) ELECTRIC MOTOR

(71) Applicant: Schaeffler Technologies AG & Co. KG, Herzogenaurach (DE)

(72) Inventors: Friedrich Schuler, Wilhelmsdorf (DE); Julian Junge, Puschendorf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 219 days.

(21) Appl. No.: 16/632,253

(22) PCT Filed: Jul. 11, 2018

(86) PCT No.: PCT/DE2018/100631
§ 371 (c)(1),
(2) Date: Jan. 17, 2020

(87) PCT Pub. No.: WO2019/015720
PCT Pub. Date: Jan. 24, 2019

(65) Prior Publication Data
US 2020/0169144 A1   May 28, 2020

(30) Foreign Application Priority Data
Jul. 19, 2017 (DE) .......................... 102017116249.6

(51) Int. Cl.
| | | |
|---|---|---|
| *H02K 5/10* | (2006.01) | |
| *H02K 5/173* | (2006.01) | |
| *H02K 11/215* | (2016.01) | |
| *H02K 11/33* | (2016.01) | |
| *F16C 19/18* | (2006.01) | |
| *H02K 5/08* | (2006.01) | |
| *H02K 5/22* | (2006.01) | |

(52) U.S. Cl.
CPC ......... *H02K 5/1735* (2013.01); *F16C 19/184* (2013.01); *H02K 5/08* (2013.01); *H02K 5/10* (2013.01); *H02K 5/225* (2013.01); *H02K 11/215* (2016.01); *H02K 11/33* (2016.01); *H02K 2213/12* (2013.01)

(58) Field of Classification Search
CPC .... H02K 5/1735; H02K 11/215; H02K 11/33; H02K 5/08; H02K 5/225; H02K 2213/12; F16C 19/184
USPC ........................................................... 310/90
See application file for complete search history.

(56) References Cited

U.S. PATENT DOCUMENTS 4,706,512 A * 11/1987 McKernon .............. E05B 81/25
                                                        292/336.3
4,733,120 A *  3/1988 Kawabe .................. H02K 37/18
                                                        310/156.64
(Continued)

FOREIGN PATENT DOCUMENTS

CN    102052280 A    5/2011
CN    104704725 A    6/2015
(Continued)

*Primary Examiner* — Terrance L Kenerly (57) ABSTRACT

An electric motor suitable for an electric camshaft phaser comprises a main motor module and a plug-in module electrically and mechanically connected thereto. The main motor module comprises a housing shell, a stator and a rotor mounted in the housing shell by way of a rolling bearing. The main motor module is inserted into the plug-in module, and electrical connections between the plug module and the main motor module are established by insulation displacement connections, which can be produced by joining the modules in the axial direction.

20 Claims, 4 Drawing Sheets

(56) References Cited

U.S. PATENT DOCUMENTS

| | | | |
|---|---|---|---|
| 8,220,426 | B2 | 7/2012 | Uehama et al. |
| 2004/0007934 | A1* | 1/2004 | Michaels ............... H02K 3/522 |
| | | | 310/71 |
| 2007/0251473 | A1* | 11/2007 | Schafer ................... H02K 5/10 |
| | | | 123/90.11 |
| 2010/0180844 | A1 | 7/2010 | Uehama et al. |
| 2016/0123194 | A1 | 5/2016 | Kajiura et al. |

FOREIGN PATENT DOCUMENTS

| | | |
|---|---|---|
| CN | 105569757 A | 5/2016 |
| CN | 206149072 U | 5/2017 |
| CN | 206195576 U | 5/2017 |
| CN | 206271895 U | 6/2017 |
| CN | 206272010 U | 6/2017 |
| CN | 106936240 A | 7/2017 |
| DE | 10026424 C2 | 12/2002 |
| DE | 102004037991 A1 | 11/2005 |
| DE | 102006031956 A1 | 1/2008 |
| DE | 102013212933 B3 | 11/2014 |
| DE | 102013212932 A1 | 1/2015 |
| DE | 102014215523 A1 | 7/2015 |
| DE | 102014205689 A1 | 10/2015 |
| DE | 102015204929 A1 | 9/2016 |
| DE | 102015219149 A1 | 3/2017 |
| EP | 2269272 A1 | 1/2011 |
| JP | H11107718 A | 4/1999 |
| WO | 2006039968 A1 | 4/2006 |
| WO | 2007122181 A1 | 11/2007 |

* cited by examiner

ELECTRIC MOTOR

CROSS REFERENCE TO RELATED APPLICATIONS

This application is the U.S. National Phase of PCT Application No. PCT/DE2018/015720 filed on Jul. 11, 2018 which claims priority to DE 10 2017 116 249.6 filed on Jul. 19, 2017, the entire disclosures of which are incorporated by reference herein.

TECHNICAL FIELD

This disclosure relates to an electric motor for an electric camshaft phaser or for a system for variable adjustment of the compression ratio of an internal combustion engine.

BACKGROUND

An electric motor for an electric camshaft phaser is known from DE 10 2013 212 933 B3, for example. This electric motor comprises a first, pot-shaped housing part made of metal and a second housing part made of plastic, which closes off the first housing part, wherein a first rolling bearing is arranged in the first housing part and a second rolling bearing is arranged in the second housing part. In this case, the rolling bearing arranged in the first, pot-shaped housing part is designed as a fixed bearing. There is a shaft seal on the side of this rolling bearing which faces the interior of the housing.

Another electric motor of an electric camshaft phaser is disclosed in U.S. Pat. No. 8,220,426 B2. In this case too, a motor shaft of the electric motor is supported by means of two rolling bearings, namely ball bearings.

This disclosure is based on the object of developing electric motors that are suitable for camshaft phasers beyond the prior art in respect of a modular construction which is particularly easy to assemble.

SUMMARY

According to the disclosure, this object is achieved by an electric motor for an electric camshaft phaser or for a system for variable adjustment of the compression ratio. The object is furthermore achieved by a kit comprising various modules of electric motors.

In a basic design which is known per se, the electric motor for an electric camshaft phaser or for a system for variable adjustment of the compression ratio of an internal combustion engine comprises a first, pot-shaped housing part made of metal and a second housing part made of plastic, which is designed as a plug-in module and closes off the first housing part. The first, pot-shaped housing part of the electric motor according to the disclosure forms a part of a module which is referred to as the main motor module. Within the electric motor, a rolling bearing is arranged exclusively in the main motor module but not in the plug-in module. The main motor module includes the core functions of the electric motor, namely the magnetic circuit and the motor shaft supported by means of the rolling bearing. It can be a brushless DC motor having a three-phase stator winding that can be supplied with current and having a rotor fitted with permanent magnets.

The main motor module is supplied with current via the plug-in module, wherein electrical connections between the plug-in module and the main motor module are established by connections, in particular insulation displacement connections, which can be produced by fitting together the modules and therefore the entire electric motor in the axial direction of the main motor module, wherein the main motor module can be fitted by being pressed into the plug-in module, for example. This eliminates relatively expensive connections, such as soldered or welded connections.

The electrical and mechanical interface between the main motor module and the plug-in module is standardized in such a way that a single type of main motor module can be combined in any way with various types of plug-in modules. Common to all the types of plug-in module in the kit formed in this way is the standardized power supply to the main motor module that can be established by a plug connection. In addition, the plug-in module optionally comprises a sensor system interacting with the rotor, in particular in the form of a sensor circuit board. Such a sensor system allows rotor position detection for external control of the electric motor. It is also possible to integrate control electronics into the plug-in module. Overall, the kit can therefore comprise three types of plug-in modules, for example:

a plug-in module having a rotor position sensor system,
  a plug-in module having integrated control electronics, and
  a plug-in module without sensor or control components.
  In the last mentioned case, the electric motor is controlled externally without sensors.

The single rolling bearing of the electric motor is configured in such a way that it can absorb axial forces, radial forces and tilting moments. A double-row angular contact ball bearing in an O arrangement is suitable for this purpose, for example. As an alternative, said functions can be performed by a four-point bearing. In respect of possible configurations of four-point bearings, attention is drawn by way of example to documents DE 10 2014 215 523 A1 and DE 10 2014 205 689 A1. One possible application of a four-point bearing is described in WO 2007/122181 A1, for example.

Irrespective of the design of the rolling bearing, said bearing can be held in an annular shoulder, which is oriented inward from the base of the pot-shaped housing part, i.e. projects into the interior of the main motor module. In this case, the rolling bearing can project into the rotor of the electric motor, ensuring that it is at or close to the center of gravity of the rotor. A shaft sealing ring, which is arranged ahead of the rolling bearing, is optionally additionally arranged in the annular shoulder in which the rolling bearing is held, with the result that the rolling bearing is situated within the sealed off interior of the main motor module.

To ensure static sealing of the electric motor, a sealing ring can be provided, sealing off the main motor module both with respect to the plug-in module and with respect to an external screw mounting surface. In one embodiment, the sealing ring makes contact with a metal insert, made of sheet steel for example, which can be attributed to the plug-in module and, in particular, is fitted in a permanently fixed manner into a plug-in module housing manufactured from plastic, e.g. by overmolding. The housing of the main motor module is pressed into the annular metal insert, thereby giving rise to a permanently fixed frictional connection which can endure the entire temperature range.

According to one possible embodiment, the housing of the plug-in module is embodied at least partially as a metal heatsink, made from aluminum or some other light metal material for example. This may be advisable especially in the case of integrated power electronics. The selective heat dissipation via the plug-in module favors forms of construction of the electric motor in which the main motor module has a particularly simple, compact external contour.

Electrical connections between the plug-in module and the main motor module can be produced in a particularly simple and, at the same time, durable manner as insulation displacement connections. In respect of the technological background, attention is drawn in this context to documents DE 100 26 424 C2 and DE 10 2004 037 991 A1.

In the present case, initially insulated conductors to be contacted are situated on the same side as the main motor module, for example. During the assembly of the modules, the mating parts of the insulation displacement connections on the part of the plug-in module are designed first of all to remove the insulation from the conductors and then to produce both an electrical and mechanical connection, wherein sections of the electric conductors to be attributed to the plug-in module grip a wire arranged in the main motor module in the manner of barbs, for example.

The main mechanical components of the plug-in module, which is aligned transversely to the longitudinal axis of the main motor module as a substantially flat component, can be manufactured from plastic, particularly by injection molding. In one embodiment, punched grids are molded into this main component, establishing the electrical connections between the contact with the main motor module, on the one hand, and a plug to be connected externally, on the other. If the plug-in module comprises a sensor system which is arranged on a circuit board, press-fit contacts which establish the electrical connection between the punched grid and the circuit board are provided, for example. A magnetized sensor magnet ring interacting with the sensor system can be secured on the rotor, e.g. by means of grooved pins or rivets.

When the electric motor is used in an electromechanical camshaft phaser, a double-vane drive element, for example, which introduces a torque into an actuating mechanism, optionally via a compensating coupling, is secured on the motor shaft of the main motor module. It is likewise possible for a gearwheel or some other element suitable for torque transmission, e.g. a single-finger coupling, to be connected to the motor shaft. It is likewise possible for contours for torque transmission to be integrated into the shaft, e.g. in the form of flats.

The mechanical attachment of the electric motor to a surrounding structure can be made in the region of the interface between the main motor module and the plug-in module. At this interface, the pot-shaped housing of the main motor module projects into the plug-in module, this being advantageous both in regard to mechanical stability and in regard to sealing with the aid of the single sealing ring already mentioned. Another advantage is provided by the particularly simple geometric configuration of the pot-shaped housing part. In particular, the pot-shaped housing part can have a continuously smooth, cylindrical lateral surface. In contrast to the main motor module, which has standardized external contours, various types of plug-in modules that can be combined arbitrarily with the main motor module can have different external contours dependent on the scope of the functions of the plug-in module.

BRIEF DESCRIPTION OF THE DRAWINGS

An illustrative embodiment of the embodiments is explained in greater detail below with reference to a drawing. In the drawings.

DETAILED DESCRIPTION OF THE EMBODIMENTS

Figure 1:
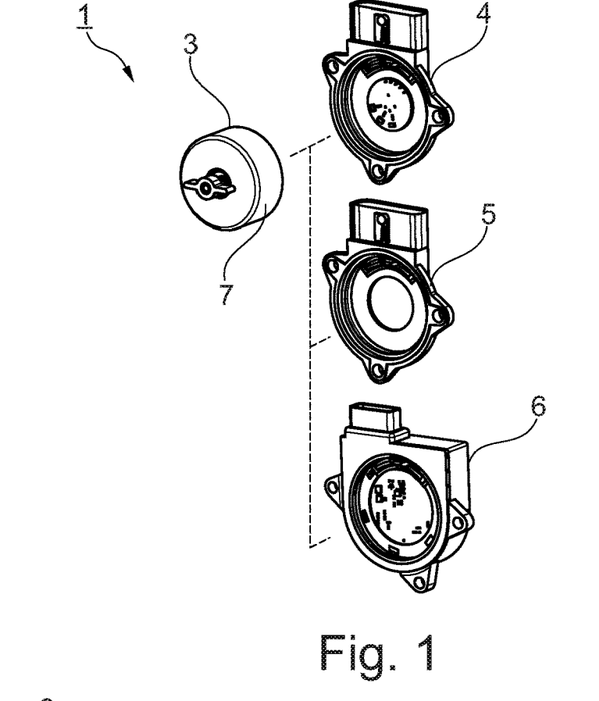
FIG. 1 shows a set for the assembly of electric motors, constructed from a main motor module and various plug-in modules.

FIG. 1 shows a kit, denoted overall by the reference sign 1, which is suitable for constructing various electric motors 2. The electric motors 2 are used in electromechanical camshaft phasers of the kind that are known in principle from the cited prior art.

The kit 1 is made up of a main motor module 3 and various plug-in modules 4, 5, 6. All the core functions of the electric motor 2 are implemented in the main motor module 3. The construction of the main motor module 3 and of a complete electric motor 2 is evident from FIG. 2.

Figure 2:
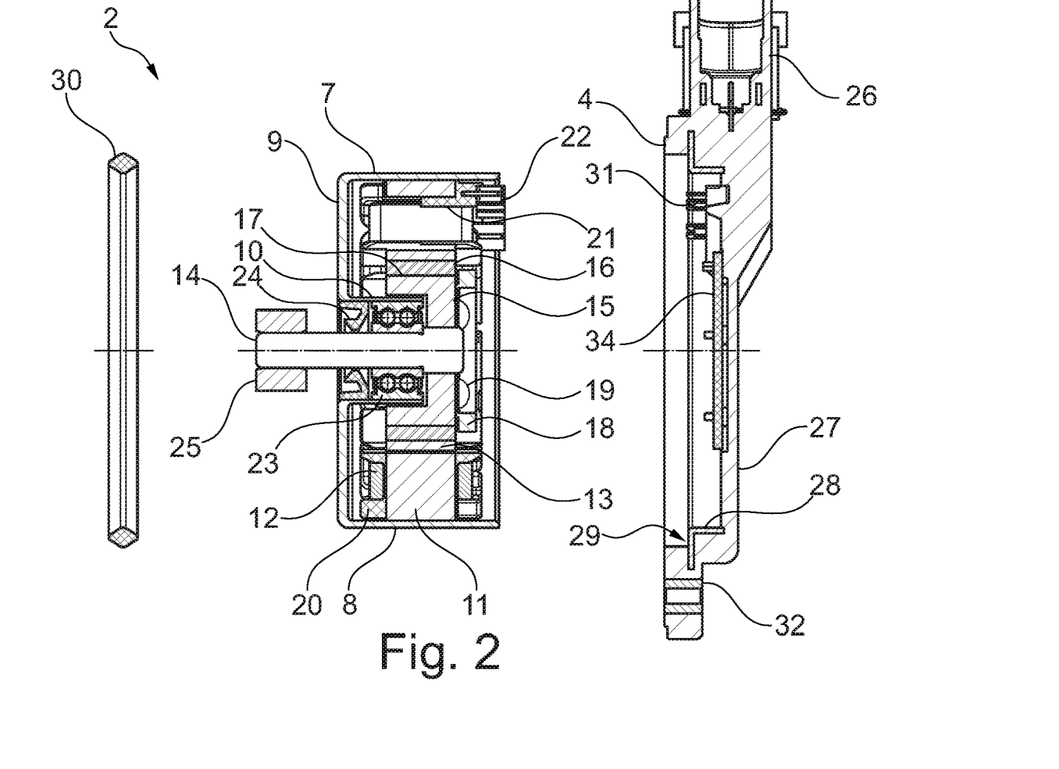
FIG. 2 shows a variant of an electric motor that can be constructed using the set shown in FIG. 1, FIGS. 3 and 4 show various plug-in modules that can be combined with the main motor module.

A housing 7 of the main motor module 3 is configured as a housing pot made of sheet metal. The outer wall, denoted by 8, of the housing 7 is continuously cylindrical. Adjoining the outer wall 8 is a housing base 9 in the form of an annular disk. Adjoining the inner rim of the housing base 9 there is in turn an annular shoulder 10, which is concentric with the outer wall 8 and which extends at least a third as far as the housing pot 7 in the axial direction of the main motor module 3. Overall, the housing 7 thus defines the shape of a channel running around in the form of a ring, the outer rim of which, in the form of the outer wall 8, is higher than the inner wall, in the form of the annular shoulder 10.

Overall, the main motor module 3 is constructed as an internal rotor, wherein a stator 11, which has windings 12 that can be supplied with current, interacts with a rotor 13, which is secured on a shaft 14, that is to say the motor shaft. The rotor 13 has a pot shape, which is open toward the housing base 9. A rotor base denoted by 15 thus faces the end of the main motor module 3 remote from the housing base 9. This is the end of the main motor module 3 which is to be connected to one of the plug-in modules 4, 5, 6, as will be explained in greater detail below. The rotor is fitted with permanent magnets 16. Overall, the main motor module 3 functions as a brushless DC motor. The permanent magnets 16 are embedded in a hollow-cylindrical section 17 of the rotor 13, which adjoins the rotor base 15 and is fitted over the annular shoulder 10, i.e. overlaps with the latter in the axial direction. A sensor magnet ring 18, which is secured by grooved pins 19, can be seen on the outside of the rotor base 15. The sensor magnet ring 18 optionally interacts with the plug-in module 4, 5, 6. A lower plug-in insulator 20 and an upper plug-in insulator 21 can furthermore be seen in FIG. 2. The upper plug-in insulator 21 is situated in the region of a connection piece 22, which projects beyond the open end of the housing pot 7 and has a function, described in greater detail below, in interaction with the plug-in module 4, 5, 6.

To support the shaft 14 together with the rotor 13, a rolling bearing 23 is integrated into the main motor module 3, said bearing being designed as a double-row angular contact ball bearing in the design shown in FIG. 2. The rolling bearing 23 is capable in a known manner of absorbing radial forces, axial forces and tilting moments and is situated close to the center of gravity of the arrangement comprising the shaft 14 and the rotor 13. The rolling bearing 23 is inserted into the annular shoulder 10 and ends flush with the latter at the end, toward the center of the interior of the housing 7. A free space, into which a radial shaft sealing ring 24 is inserted, is therefore formed at the opposite end of the rolling bearing 23. The rolling bearing 23 is lubricated with grease and is therefore situated within the sealed interior of the electric motor 2. A double-vane drive element 25, which is used to introduce torque into a camshaft phaser actuating mechanism designed as a three-shaft mechanism (not shown), is secured on the shaft 14, which projects from the main motor module 3 and is sealed with the aid of the radial shaft sealing ring 24.

Each plug-in module 4, 5, 6 is a substantially flat component which lies in a plane normal to the axis of rotation of the electric motor 2. A terminal section 26 of the plug-in module 4, 5, 6, which is at the top in the arrangement shown in FIG. 2, is used to connect leads for supplying power and/or transmitting electric signals. In all cases, the leads to be connected to the electric motor 2 can be connected with the aid of plug connection elements (not shown), which can be plugged into the terminal section 26 in a direction which is orthogonal to the longitudinal direction of the shaft 14, i.e. to the central axis of the electric motor 2. This favors a construction of the entire electric motor 2 which is particularly space-saving in the axial direction.

The connection contours of all the plug-in modules 4, 5, 6 are of standard configuration in regard to assembly with the main motor module 3. A steel insert 28 made from sheet metal is secured permanently, by means of overmolding for example, in a housing 27, manufactured from plastic, of the plug-in module 4, 5, 6. The inside diameter of the steel insert 28 corresponds to the outside diameter of the housing pot 7 plus an allowance for the press fit for a permanent frictional connection between the metal parts 7, 28.

Figure 9:
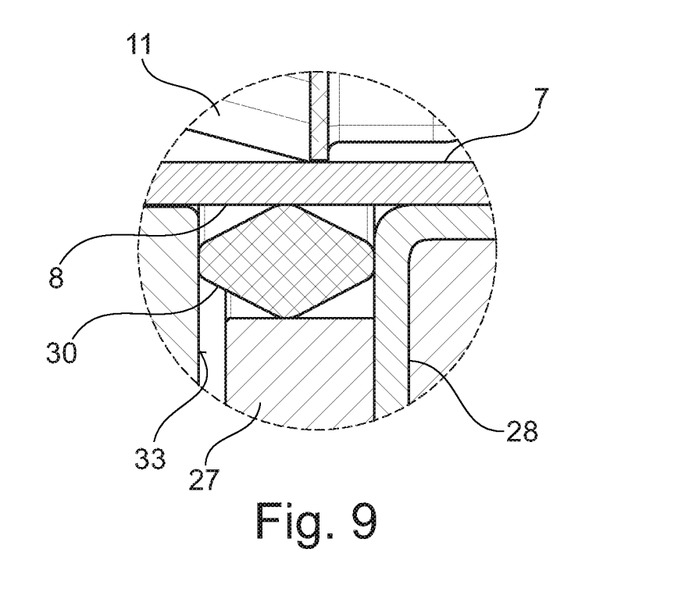
FIG. 9 shows in detail a seal of the electric motor in the installed state.

The steel insert 28 has the shape of an angled ring and is at a distance from the open end of the housing 27, that facing the main motor module 3. At this end, between the steel insert 28 and the housing 27, a shoulder 29 running around in the form of a ring is formed, said shoulder being provided for the purpose of accommodating a sealing ring 30. Various connection elements 31 of the plug-in module 4, 5, 6, which are provided for connection to the terminal section 26 of the main motor module 3, project in the axial direction beyond the steel insert 28 but not as far as the end of the plug-in module 4, 5, 6 in the illustrative embodiment. The entire plug-in module 4, 5, 6 can be secured on an external screw mounting surface 33 (FIG. 9) using metal sleeves 32 inserted into the housing 7.

The configuration of the electric motor 2 shown in FIG. 2 corresponds to the combination of the main motor module 3 with the plug-in module 4 illustrated at the top in FIG. 1. This plug-in module 4 has a sensor system in the form of a sensor circuit board 34, which is inserted into the housing 27 and, in interaction with the sensor magnet ring 18, supplies information relating to the position and/or rotation of the rotor 13. The connection pieces 22 and the terminal elements 31 are situated radially outside the sensor circuit board 34, in relation to the axis of rotation of the electric motor 2. All the electrical connections between the plug-in module 4 and the main motor module 3 which are required for the operation of the electric motor 2 can be established simply by fitting together the plug-in module and the main motor module 3 in the axial direction of said modules 3, 4 and hence of the entire electric motor 2, wherein the main motor module 3 is plugged into the plug-in module 4. This also applies when using one of the two other plug-in modules 5, 6.

Figure 3:
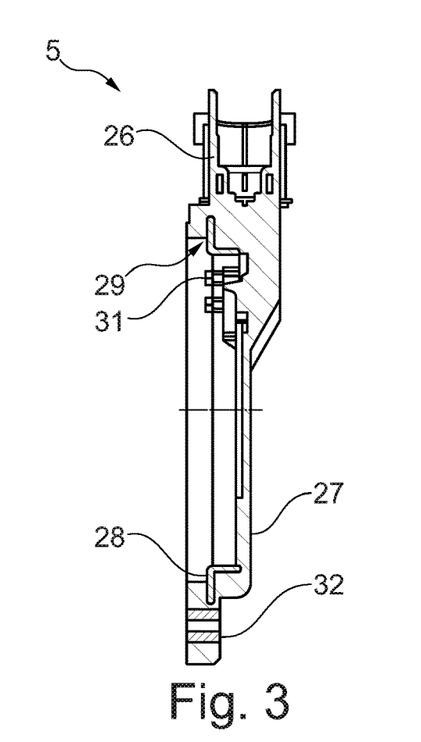

Plug-in module 5, which is illustrated centrally in FIG. 1 and separately in FIG. 3, differs from plug-in module 4 by the omission of the sensor circuit board 34. In this case, external control of the electric motor 2 without sensors is provided.

Figure 4:
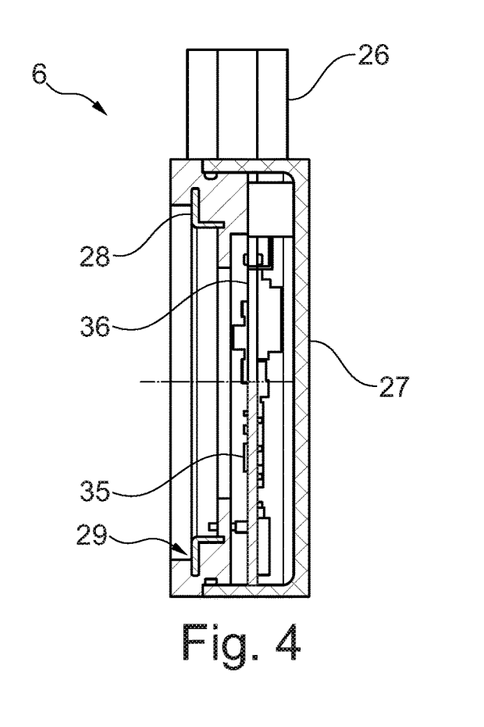

The plug-in module 6 illustrated at the bottom in FIG. 1 and separately in FIG. 4 has complete control electronics 35, which are arranged on a circuit board 36 inserted into the housing 27 in a manner similar to sensor circuit board 34. Plug-in module 6 is enlarged in comparison with plug-in modules 4, 5.

Figure 5:
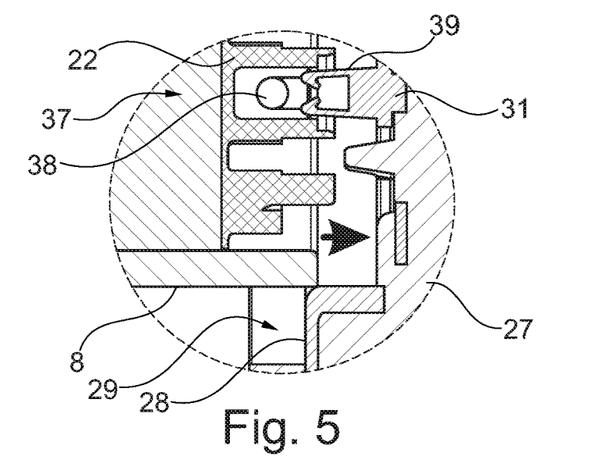
FIGS. 5 and 6 show an insulation displacement connection between the main motor module and the plug-in module.
Figure 6:
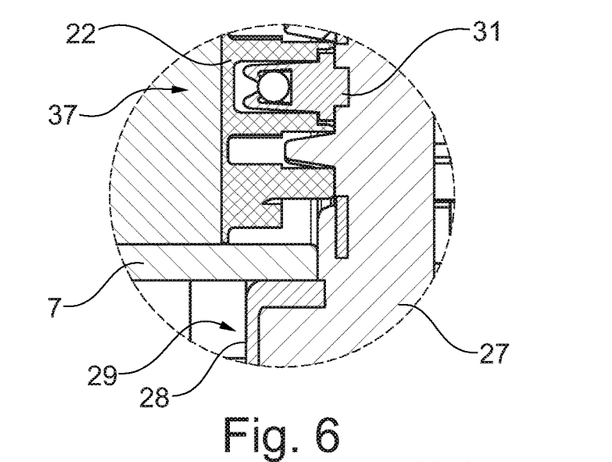

The connection piece 22 of the main motor module 3 and the terminal elements 31 of the plug-in module 4, 5, 6 are used to implement an insulation displacement connection 37, as will be explained below with reference to FIGS. 5 and 6.

Arranged within the connection piece 22 is an insulated wire 38, via which current can be fed to a winding 12 of the main motor module 3. The terminal element 31 is in the form of a two-armed pincer, the arms of which are denoted by 39. If the plug-in module 4, 5, 6 is moved from the separated position (FIG. 5) to the position in which it is connected to the main motor module 3 (FIG. 6), the two arms 39 are first of all spread apart as they are pushed over the wire, wherein the insulation of the wire 38 is ruptured and electric contact is thus established.

Figure 7:
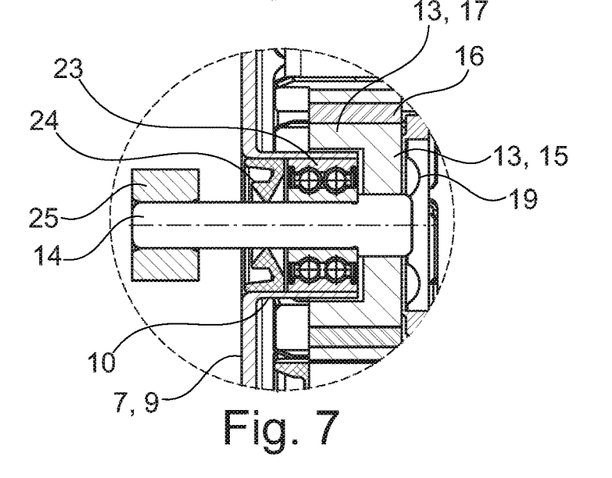
FIG. 7 shows a section through the bearing arrangement and the rotor of the main motor module.

The incorporation of the rolling bearing 23 into the main motor module 3 can be seen in detail in FIG. 7. In the design illustrated, the rolling bearing 23 is configured as a double-row angular contact ball bearing. As an alternative, the rolling bearing 23 could be a single-row four-point bearing, for example. In either case, the rolling bearing 23 provides the only bearing support for the electric motor 2. There is no sliding or rolling bearing support in the plug-in module 4, 5, 6.

Figure 8:
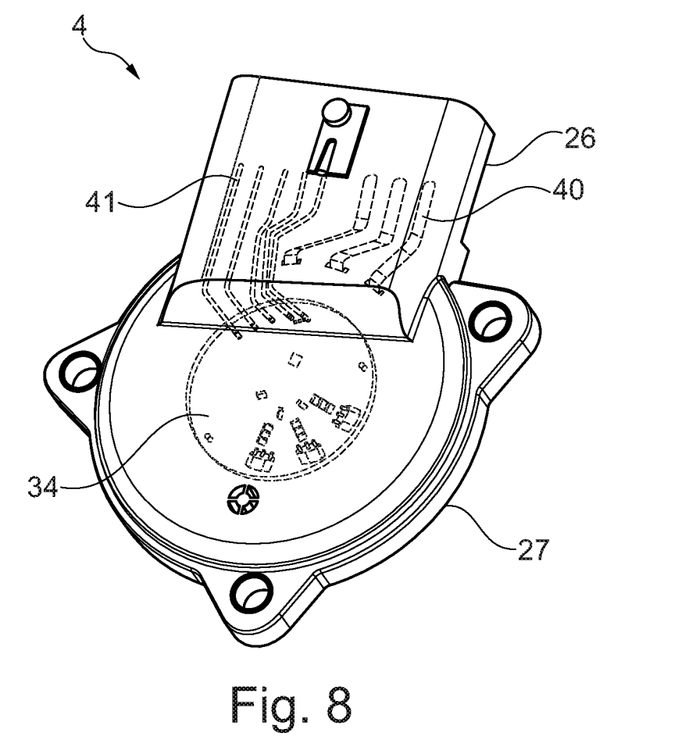
FIG. 8 shows an electric motor comprising the plug-in module shown in FIG. 3, in a simplified semitransparent view.

FIG. 8 shows features of plug-in module 4 in perspective. In addition to three conductor strips 40, which transmit current for the power supply to the windings 12, narrower conductor strips 41 can be seen overall, these being provided for the purpose of transmitting signals between the electric motor 2 and an external control system. From the terminal section 26, the wider conductor strips 40 and narrower conductor strips 41 are each routed through the housing 27 in angled form in each case. The ends of the conductor strips 40 which point in the axial direction of the electric motor 2 are designed as components of the insulation displacement connections 37, as illustrated in FIGS. 5 and 6. In contrast, press-fit contacts are formed on the sensor circuit board 34 and the ends of the relatively narrow conductor strips 41, said ends likewise pointing in the axial direction.

The entire electric motor 2 has the sealing ring 30 as the only static seal. As is apparent from FIG. 9, the sealing ring 30 has an approximately diamond shaped cross section in the illustrative embodiment, wherein, in the installed state, it makes contact with the steel insert 28, a plastic surface of the housing 27, the cylindrical outer wall 8 of the housing 7 and the screw mounting surface 33 not attributable to the electric motor 2. Thus, both sealing between the main motor module 3 and the plug-in module 4, 5, 6 and sealing between the entire electric motor 2 and the screw mounting surface 33 is ensured.

LIST OF REFERENCE CHARACTERS 1 kit
2 electric motor
3 main motor module
4 plug-in module
5 plug-in module
6 plug-in module
7 housing, housing pot
8 outer wall
9 housing base
10 annular shoulder
11 stator
12 winding
13 rotor
14 shaft
15 rotor base
16 permanent magnet
17 hollow-cylindrical section
18 sensor magnet ring
19 grooved pin
20 lower plug-in insulator
21 upper plug-in insulator
22 connection piece
23 rolling bearing
24 radial shaft sealing ring
25 drive element
26 terminal section
27 housing of the plug-in module
28 steel insert
29 shoulder
30 sealing ring
31 connection element of the plug-in module
32 sleeve
33 screw mounting surface
34 sensor system, sensor circuit board
35 control electronics
36 circuit board
37 electrical connection, insulation displacement connection
38 wire
39 arm
40 conductor strip
41 conductor strip

The invention claimed is:

1. An electric motor configured for an electric camshaft phaser or for a system for variable adjustment of a compression ratio of an internal combustion engine, the electric motor comprising:
   a main motor module comprising:
      a housing pot;
      a stator; and,
      a rotor supported in the housing pot by a rolling bearing; and,
   a plug-in module electrically and mechanically connected to the main motor module, the main motor module inserted into the plug-in module, and electrical connections between the plug-in module and the main motor module produced by fitting together the plug-in and main motor modules in an axial direction.

2. The electric motor as claimed in claim 1, wherein the rolling bearing is one of either a double-row angular-contact ball bearing or a four-point bearing.

3. The electric motor as claimed in claim 1, wherein the stator is disposed in the housing pot.

4. The electric motor as claimed in claim 1, wherein the housing pot has a housing base, the housing base forming a central annular inward-oriented shoulder that holds the rolling bearing.

5. The electric motor as claimed in claim 1, wherein the main motor module is mechanically secured to the plug-in module via insertion of the main motor module into the plug-in module.

6. The electric motor as claimed in claim 1, wherein the plug-in module comprises a sensor circuit board that interacts with the rotor.

7. The electric motor as claimed in claim 1, wherein the plug-in module comprises control electronics for controlling the main motor module.

8. The electric motor as claimed in claim 1, wherein the electric connections between the plug-in module and the main motor module are insulation displacement connections.

9. An electric motor kit comprising:
   a main motor module comprising a housing pot, a stator, and a rotor; and,
   a plurality of different plug-in modules configured to be electrically and mechanically connected to the main motor module, and each one of the plurality of different plug-in modules and the main motor module are electrically and mechanically connected together in an axial direction; and,
   wherein the main motor module is secured to each one of the plurality of different plug-in modules via a press fit between a first diameter of a first housing of the main motor module and a second diameter of a second housing of each one of the plurality of different plug-in modules.

10. The electric motor kit of claim 9, wherein one of the plurality of different plug-in modules includes a rotor position sensor system.

11. The electric motor kit of claim 9, wherein one of the plurality of different plug-in modules includes integrated control electronics.

12. The electric motor kit of claim 9, wherein:
   one of the plurality of different plug-in modules includes a rotor position sensor system; and,
   one of the plurality of different plug-in modules includes integrated control electronics for controlling the main motor module.

13. The electric motor kit as claimed in claim 9, wherein the first diameter is an outer diameter of the first housing, and the second diameter is an inner diameter of the second housing.

14. The electric motor kit as claimed in claim 13, wherein the plug-in module includes an insert that is permanently secured within the plug-in module, the insert configured with the second diameter.

15. The electric motor kit as claimed in claim 14, wherein the insert is a steel ring that is overmolded within the second housing of the plug-in module.

16. The electric motor kit as claimed in claim 15, wherein the steel ring is includes a shoulder configured to receive a sealing ring arranged between the first and second housings.

17. An electric motor configured for an electric camshaft phaser or for a system for variable adjustment of a compression ratio of an internal combustion engine, the electric motor comprising:
   a main motor module comprising:
      a housing pot;
      a stator; and,
      a rotor; and, a plug-in module electrically and mechanically connected to the main motor module, the main motor module inserted into the plug-in module, and electrical connections between the plug-in module and the main motor module produced by fitting together the plug-in and main motor modules in an axial direction; and the main motor module and the plug-in module having only one rolling bearing configured to support the rotor, the one rolling bearing arranged within the housing pot.

18. The electric motor as claimed in claim 17, wherein the one rolling bearing is one of either a double-row angular-contact ball bearing or a four-point bearing.

19. The electric motor as claimed in claim 17, wherein the main motor module is mechanically secured to the plug-in module via axial insertion of the main motor module into the plug-in module.

20. The electric motor as claimed in claim 17, wherein the main motor module is mechanically secured to the plug-in module via a press fit between a first diameter of a first housing of the main motor module and a second diameter of a second housing of the plug-in module.

\* \* \* \* \*